United States Patent Office 3,557,536
Patented Jan. 26, 1971

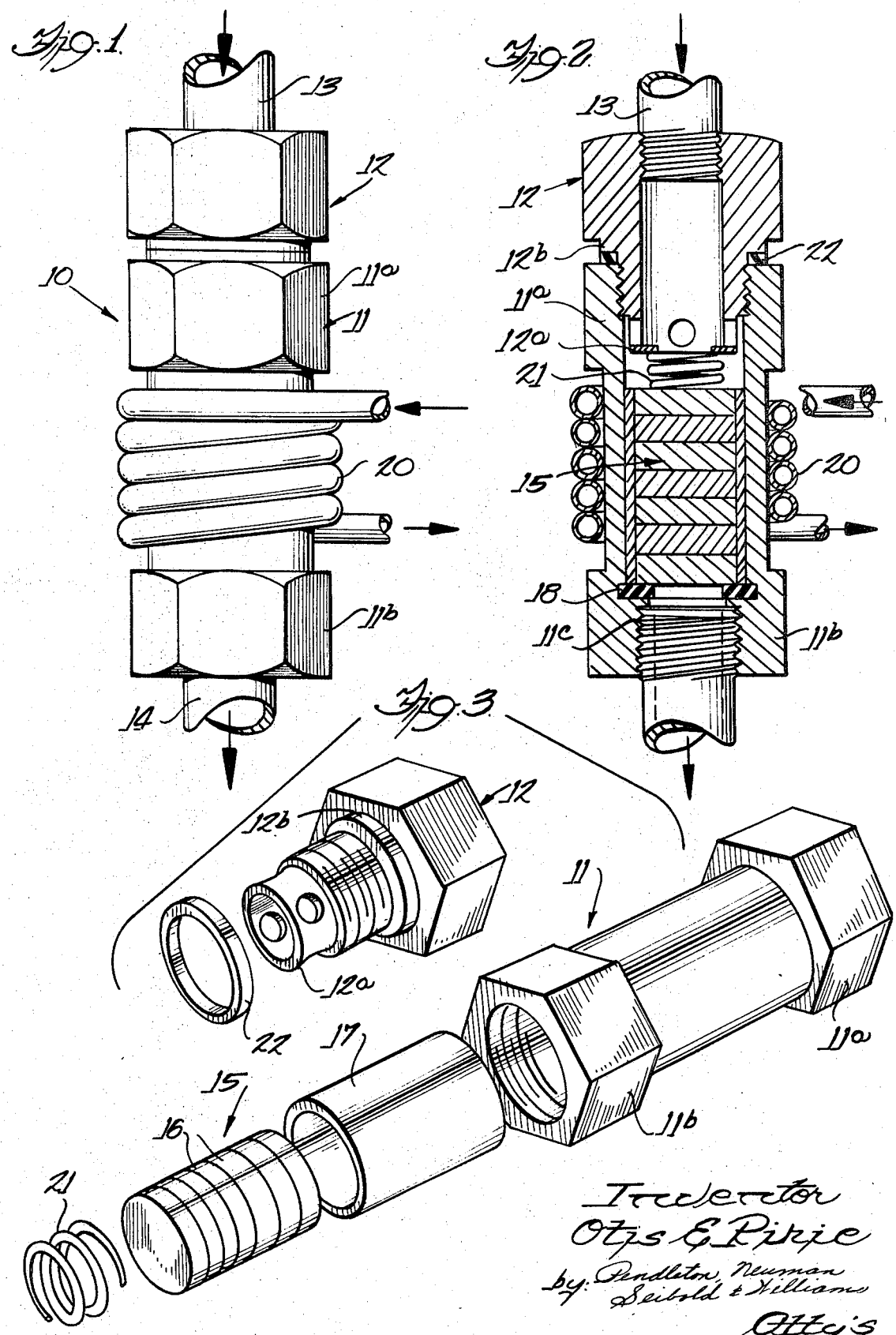

3,557,536
FILTER ASSEMBLY
Otis E. Ririe, Bartlesville, Okla., assignor to Phillips
Petroleum Company, a corporation of Delaware
Filed Dec. 30, 1968, Ser. No. 787,896
Int. Cl. B01d 35/02
U.S. Cl. 55—269                                   3 Claims

ABSTRACT OF THE DISCLOSURE

A heated filter assembly is provided for use in removing thermoplastic particles from a vapor stream. The assembly includes a replaceable porous filter unit through which the vapor stream is caused to pass. The unit is heated to a predetermined temperature whereby the thermoplastic particles entrained in the vapor stream are retained by the unit and become soft or melt and form a sticky agglomerate.

BACKGROUND OF THE INVENTION

In the analyzing of various vapor specimens, it is oftentimes important because of the delicate and sensitive character of the instruments utilized in making the analysis that the vapor specimens in question be free of entrained particles or fines. Such analyses are routinely made during the commercial production of various types of plastics in order to maintain quality control.

Various filters have heretofore been used for this purpose; however, because of certain design features they have been possessed of one or more shortcomings. For example, with such filters a marked pressure drop is normally required to force the fluid therethrough. In addition, such filters are oftentimes of costly construction, quickly become clogged, are difficult and expensive to maintain in proper working condition, and/or require frequent and prolonged periods of shut down of the analyzing apparatus.

SUMMARY OF THE INVENTION

Thus, it is an object of this invention to provide a filter assembly which is of a simple construction and yet is highly effective in removing from sample vapor streams particles or fines of extremely small size.

It is a further object of this invention to provide a filter assembly which will permit a high vapor flow rate therethrough.

It is a still further object of this invention to provide a filter assembly wherein the particles or fines are filtered out of the circulating vapor stream even though said particles or fines are smaller in size than the pore sizes in the filter.

It is a still further object of this invention to provide a simple, expedient and effective method of removing submicron thermoplastic particles or fines from a vapor stream with but a minimum of pressure drop occurring.

Further and additional objects will appear from the description, accompanying drawing and appended claims.

In accordance with one embodiment of this invention, a filter assembly is provided for use in removing thermoplastic particles from a vapor stream. The assembly includes a tubular member through which the vapor stream is caused to pass, and a porous filter unit replaceably mounted within the tubular member and disposed within the flow path of said vapor stream. Mounted on the tubular member is a means for heating the filter unit to a predetermined temperature whereby the thermoplastic particles removed from the vapor stream by the filter unit are softened or melted so as to form a sticky agglomerate.

DESCRIPTION

For a more complete understanding of the invention reference should be made to the drawing wherein:

FIG. 1 is an enlarged elevational view of one form of the improved filter assembly.

FIG. 2 is an enlarged vertical sectional view of the filter assembly of FIG. 1.

FIG. 3 is a perspective view of the improved filter assembly and showing the component parts thereof in disassembled relation.

Referring now to the drawing and more particularly to FIG. 1, an improved filter assembly 10 is shown for use in removing from a vapor stream minute thermoplastic particles or fines which have not previously been removed. The improved filter assembly 10 is normally used as a secondary filter because of its small surface area.

In the commercial production of various plastics, it is routine procedure to make periodic tests or analyses of the product at various stages of production. Such tests or analyses are of utmost importance in maintaining quality control. Delicate measuring instruments or devices are frequently utilized in performing such tests or analyses and therefore in order to maintain the sensitivity of these instruments or devices and prevent clogging or contamination thereof, it is necessary that the specimen to be analyzed, for example a vapor stream, be free of any entrained foreign particles or fines. The improved filter assembly 10 is therefore particularly suitable in serving to remove thermoplastic particles or fines which might accidentally be entrained in the vapor stream and thus impair the accuracy of the measuring instrument or device located downstream.

Assembly 10 in the illustrated embodiment comprises an outer casing or tubular member 11 which is formed of metal or other suitable heat-conductive material. Both ends of the member 11 may be internally threaded. The upper end 11a is adapted to receive a connector piece 12, which, in turn, receives the end of a pipe section 13. The pipe section 13 is tapped into the production line, not shown, at a selected station where the vapor specimen is to be analyzed.

Threaded into the lower end 11b of member 11 is a second pipe section 14 which leads to a suitable measuring instrument or device, not shown. Replaceably mounted within the interior of member 11 is a filter unit 15, which in the illustrated embodiment comprises a plurality of similar porous discs 16 arranged in face-to-face relation. Each disc may be formed of a sintered stainless steel material having approximately 50% voids. Interposed the discs is a thin gasket which compensates for any irregularities occurring in faces of each disc. In one instance the discs are snugly accommodated within an elongated metallic bushing 17 which, in turn, is snugly disposed within tubular member 11. The lower end of the bushing and the accommodated filter unit are in contact with a washer 18 which rests against a shoulder 11c formed in the interior of tubular member adjacent the lower end thereof. In instances where the filter unit discs are machined to size, the bushing 17 may be omitted.

Encompassing the exterior of the central portion of the tubular member 11 is a section of coiled pipe 20 through which steam or some other heated fluid circulates. The pipe section 20, which is formed of a heat conductive material, snugly engages the tubular member. Where the particles or fines sought to be removed are of polyethylene, the desired temperature to which the filter unit 15 is to be heated is approximately 300° F.

To maintain the discs 16 and gaskets in proper assembled relation, the uppermost disc is engaged by a coil spring 21 having flattened ends. The spring is compressed between the uppermost disc 16 and a shoulder formed at the lower reduced end 12a of the connector piece 12. As aforementioned, the piece 12 is threaded into the end 11a of member 11 until an exterior shoulder 12b formed on piece 12 compresses a washer 22 against the end of member 11.

Once the filter unit 15 has reached 300° F., the thermoplastic particles or fines upon contacting the surfaces of the heated discs will become softened or melted, forming a sticky agglomerate. Once one or more of the discs becomes clogged by the sticky agglomerate, the assembly 10 may be readily disassembled and the appropriate number of discs replaced. The flow rate through the assembly is normally within the range of 1000–3000 cc./min. However, in certain instances the rate might be substantially less.

In normal filtering the particles or fines are retained by the filter because two or more spaced portions of the filter circumjacent a pore thereof engage the particle or fine; thus, the degree of filtration is directly related to the pore size of the filter. In the instant construction, however, the degree of filtration is not so related because with the heated filter, if only one portion of the filter circumjacent a pore contacts a particle or fine, the latter will either melt or become sticky and adhere to the filter. By reason of this phenomenon, the pore size may be larger than the particles and fines with the result that a substantially smaller pressure drop occurs as the vapor flows through the filter.

The number of discs comprising the filter unit may vary according to the degree of filtering desired. The type of material used to form the discs may also be varied from that described and the temperature to which the discs are heated will depend upon the characteristics of the particles or fines to be filtered. In addition, the heating of the discs might be accomplished by electrically energized means.

Thus, it will be seen that a simple, yet effective filter assembly has been provided which may be readily assembled and disassembled and is capable of being modified so as to perform a variety of filtering operations.

While several embodiments of the invention have heretofore been described, it is to be understood, of course, that the invention is not limited thereto, but further modifications are contemplated and it is intended by the appended claims to cover such modifications.

I claim:

1. A filter assembly for use in removing thermoplastic particles from a vapor stream, said assembly comprising a tubular member of heat conductive material through which the vapor stream is caused to pass; a pipe connector removably mounted on one end of said tubular member including an inlet; an internal shoulder disposed adjacent the opposite end of said tubular member said opposite end including an outlet; a filter unit removably mounted within said tubular member and through which the vapor stream is caused to flow, said unit being in heat conductive contact with the tubular member interior wall and including a plurality of porous heat conductive discs each having a voidage of substantially 50%, said discs being arranged transversely of the axis of said tubular member and in stacked relation, one end of said stack engaging means on said internal shoulder; resilient means disposed intermediate a wall of said pipe connector and the opposite end of the stack of discs and exerting a compressive force on the latter; and heating means positioned about said tubular member in heat conductive relation with said tubular member for heating said tubular member and said plurality of discs to a predetermined temperature whereby the thermoplastic particles entrained in the vapor stream form a sticky agglomerate on said discs as the vapor stream flows therethrough.

2. The filter assembly of claim 1 wherein the filter unit includes a heat conductive sleeve encompassing and engaging the stack of discs, the exterior of said sleeve being encompassed by said tubular member and in heat conductive engagement therewith.

3. The filter assembly of claim 1 wherein said discs are formed of sintered metallic material.

References Cited

UNITED STATES PATENTS

| | | | |
|---|---|---|---|
| 1,103,306 | 7/1914 | Maher | 55—486 |
| 1,443,435 | 1/1923 | Rohrer | 55—268 |
| 2,187,877 | 1/1940 | Ferris et al. | 260—94.9F |
| 2,400,719 | 5/1946 | Stackhouse | 55—527 |
| 2,594,793 | 4/1952 | Muerle | 55—487 |
| 2,992,149 | 7/1961 | Drelich | 117—21 |
| 3,138,440 | 6/1964 | Weittenhiller et al. | 55—97 |
| 3,240,346 | 3/1966 | Callahan, Jr. et al. | 210—448 |
| 3,364,661 | 1/1968 | Manherz et al. | 55—527 |
| 3,455,792 | 7/1969 | Ohta | 55—97 |
| 3,473,300 | 10/1969 | Wilm et al. | 55—302 |

OTHER REFERENCES

Chase, H.: Heavy Plastic Coatings Applied by Fluidized Bed Method, in Metal Finishing, pp. 79–81, October 1965.

FRANK W. LUTTER, Primary Examiner

B. NOZICK, Assistant Examiner

U.S. Cl. X.R.

55—485, 503, 504, 523